US012589801B2

(12) United States Patent
Michelis et al.

(10) Patent No.: US 12,589,801 B2
(45) Date of Patent: Mar. 31, 2026

(54) METHOD FOR DETERMINING A GEAR FOR A POWER STEERING SYSTEM AS A FUNCTION OF A VEHICLE SPEED AND A STEERING WHEEL ANGLE

(71) Applicant: JTEKT EUROPE, Irigny (FR)

(72) Inventors: André Michelis, Chonas l'Amballan (FR); Pierre Larminy, Billy Sous les Cotes (FR)

(73) Assignee: JTEKT EUROPE, Irigny (FR)

( * ) Notice: Subject to any disclaimer, the term of this patent is extended or adjusted under 35 U.S.C. 154(b) by 356 days.

(21) Appl. No.: 18/154,155

(22) Filed: Jan. 13, 2023

(65) Prior Publication Data

US 2023/0249747 A1 Aug. 10, 2023

(30) Foreign Application Priority Data

Feb. 7, 2022 (FR) ...................................... 2201054

(51) Int. Cl.
$\quad$ *B62D 15/02* $\qquad$ (2006.01)
$\quad$ *B62D 5/00* $\qquad$ (2006.01)
$\quad$ *B62D 5/02* $\qquad$ (2006.01)
(52) U.S. Cl.
$\quad$ CPC ......... *B62D 15/0215* (2013.01); *B62D 5/001* (2013.01); *B62D 5/02* (2013.01)
(58) Field of Classification Search
$\quad$ CPC ...... B62D 15/0215; B62D 5/001; B62D 5/02; B62D 6/02; B62D 6/002; B62D 15/02; B62D 5/00

(Continued)

(56) References Cited

U.S. PATENT DOCUMENTS

| | | | | |
|---|---|---|---|---|
| 2001/0027895 A1* | 10/2001 | Murata | .................. | B62D 1/166 |
| | | | | 180/446 |
| 2003/0114970 A1* | 6/2003 | Hara | ...................... | B62D 5/008 |
| | | | | 180/443 |

(Continued)

FOREIGN PATENT DOCUMENTS

| | | |
|---|---|---|
| DE | 102018115329 A1 | 1/2020 |
| DE | 102019214225 A1 | 3/2021 |
| EP | 3647158 A1 | 5/2020 |

*Primary Examiner* — Anne Marie Antonucci
*Assistant Examiner* — Jodi Jones
(74) *Attorney, Agent, or Firm* — Oliff PLC

(57) ABSTRACT

A method for determining a gear ratio (VGR) for a power steering system of a vehicle, said power steering system comprising a steering wheel determining a steering wheel angle ($A_v$) and a rack determining a rack position ($X_c$), said rack position ($X_c$) varying between a lower limit rack position and an upper limit rack position ($X_{csup}$), the gear ratio (VGR) defining a ratio between the rack position ($X_c$) and the steering wheel angle ($A_v$), or conversely, characterized in that the method comprises a definition step in which the gear ratio (VGR) is defined as a function of a vehicle speed (V1, V2, V3) and of the steering wheel angle ($A_v$) so that the upper limit rack position ($X_{csup}$) corresponds to a single upper limit steering wheel angle ($A_{vsup}$).

7 Claims, 2 Drawing Sheets

(58) Field of Classification Search
USPC ..................................... 701/41; 180/400, 6.2
See application file for complete search history.

(56) References Cited

U.S. PATENT DOCUMENTS

| | | | | |
|---|---|---|---|---|
| 2005/0216155 A1* | 9/2005 | Kato | ...................... | B62D 5/008 |
| | | | | 180/408 |
| 2010/0025144 A1* | 2/2010 | Huang | ................... | B62D 6/002 |
| | | | | 180/401 |
| 2012/0330511 A1* | 12/2012 | Kawase | ................ | B62D 5/008 |
| | | | | 701/41 |
| 2019/0047616 A1* | 2/2019 | Lesbirel | ............... | B62D 15/029 |
| 2019/0176883 A1* | 6/2019 | Stanford | ................ | B62D 6/008 |
| 2020/0130728 A1* | 4/2020 | Takashima | ........... | B62D 5/0457 |

* cited by examiner

METHOD FOR DETERMINING A GEAR FOR A POWER STEERING SYSTEM AS A FUNCTION OF A VEHICLE SPEED AND A STEERING WHEEL ANGLE

The invention concerns the field of power steering systems and more particularly a method for determining a gear ratio for a power steering system, as well as a vehicle comprising a power steering system implementing such a gear ratio.

The purpose of a vehicle steering system is to allow a driver to control a vehicle trajectory by modifying an angle of orientation of the wheels, also called yaw angle, of the vehicle by means of a steering wheel. The orientation angle of the wheels, hereinafter referred to as «wheel angle», is in particular linked to an angle of the steering wheel, hereinafter referred to as «steering wheel angle». The driver changes the steering wheel angle by exerting a force on the steering wheel.

Generally, a steering system comprises several elements including said steering wheel, a rack, and two wheels each connected to a tie-rod. The rack is the part used to maneuver the wheels. The rack assumes several positions, subsequently called rack positions, along a casing. More precisely, the rack is displaced between two stops of the casing, said stops defining a lower limit rack position and an upper limit rack position which makes it possible to reach a maximum angle of orientation of the wheels. For example, it is known to designate the rack position by the value of the steering wheel angle. Generally, the zero of the rack position corresponds to the zero of the steering wheel angle which allows a straight line trajectory of the vehicle. Of course, the invention is not limited to this embodiment, the zero of the rack position could correspond to another steering wheel angle.

In a mechanical or traditional type electric power steering system, there is a mechanical link, generally made by a steering column, between the steering wheel and the rack. Thus, generally, a ratio between a variation of the steering wheel angle and a variation of the rack position, hereafter called gear ratio, is determined by mechanical elements via a gear ratio of a pinion.

However, there are steering systems of the mechanical type with variable gear reduction, also called «Active Front Steering», in which the gear ratio can be adjusted via a software.

In an electric power steering system without a mechanical link, called «steer-by-wire», the steering wheel is mechanically detached from the rack. In this case, the steering system comprises a steering wheel unit mechanically independent of a rack and pinion unit. In other words, a force applied to the steering wheel unit is not mechanically transmitted to the rack unit, and vice versa.

In the steering systems of the «steer-by-wire» type, as in the steering systems of the mechanical type with variable gear reduction, the ratio between the variation of the steering wheel angle and the variation of the rack position, is adjusted via a software. Thus, the gear ratio can be modified according to, for example, a position of the rack and/or a speed of the vehicle.

Generally, the gear ratio is low at low speed in order to facilitate a vehicle maneuvering, and high at high speed to improve vehicle controllability. Thus, the gear ratio is a function of the vehicle speed.

The drawback exposed by such a relation is to have an upper limit steering wheel angle which varies according to the speed of the vehicle as illustrated in FIG. 1. Indeed, for each vehicle speed V1, V2, V3 the steering wheel angle $A_v$ corresponds to a different rack position $X_c$, So that the upper limit rack position $X_{csup}$, which is fixed, is reached for different upper limit steering wheel angles $A_{v1sup}$, $A_{v2sup}$, $A_{v3sup}$. In other words, the driver can turn the steering wheel more or less depending on the speed of the vehicle.

This leads to a disturbance of the driver driving experience. Indeed, the driver feels a torque-steer effect of the steering wheel, that is to say an increase in the upper limit steering wheel angle, during acceleration, while he feels a return effect, that is to say a decrease in the upper limit steering wheel angle when slowing down. Finally, during a loss of grip in an oversteer, it is difficult to find a suitable counter-steering wheel angle.

The object of the invention is to remedy all or part of the aforementioned drawbacks by proposing a method for determining a gear ratio for a power steering system of a vehicle, said power steering system comprising a steering wheel determining a steering wheel angle and a rack determining a rack position, said rack position varying between a lower limit rack position and an upper limit rack position, the gear ratio defining a ratio between the rack position and the steering wheel angle, or between the steering wheel angle and the rack position, characterized in that the method comprises a definition step in which the gear ratio is defined as a function of a vehicle speed and of the steering wheel angle so that the upper limit rack position corresponds to a single upper limit steering wheel angle.

The rack position corresponds to an image value of the rack position that can be measured directly on the rack or obtained by deduction or calculation. For example, the image of the rack position can be obtained by a position of an assistance motor modifying the rack position, by a position sensor, an angle sensor, or by an orientation angle of the wheels or wheel yaw angle.

The rack position varies between two stops, one of which represents the upper limit rack position. The stops can be physical or virtual. It is generally accepted that the 0° rack position corresponds to the center of the rack.

Similarly, the steering wheel angle corresponds to an image value of the steering wheel angle which can be measured directly on the steering wheel or obtained by deduction or calculation. For example, the image of the steering wheel angle can be obtained by a position of a motor exerting a torque on an axis of a column supporting the steering wheel or by an absolute angle sensor positioned on said axis of the column supporting the steering wheel.

The gear ratio is obtained by the following formula:

$$VGR = \frac{A_v}{X_c} \qquad \text{[Math 1]}$$

With:
VGR: the gear ratio,
$A_v$: the steering wheel angle
$X_c$: the rack position
Or by the formula [Math 2]

$$VGR = \frac{X_c}{A_v}$$

With:
VGR: the gear ratio,
$A_v$: the steering wheel angle $X_c$: the rack position It is generally accepted that the formula Math 2 is the inverse of the gear ratio. Thus, in the rest of the description, it is considered that the gear ratio is calculated with the formula Math 1.

According to the invention, the gear ratio depends on the vehicle speed. This ensures good maneuverability at low speed by determining a low gear ratio, and good controllability at high speed with a high gear ratio.

According to the invention, the gear ratio also depends on the steering wheel angle. Thus, the gear ratio is adapted as a function of the steering wheel angle so that the upper limit rack position corresponds to a single upper limit steering wheel angle. In other words, whatever the speed of the vehicle, the steering wheel angle varies over a range, an upper limit of which is the upper limit steering wheel angle.

In this way, when the driver turns the steering wheel so as to position the steering wheel according to the upper limit steering wheel angle, and therefore the rack at the upper limit rack position, a decrease or increase in the vehicle speed does not modify the driver feeling. In other words, the steering wheel remains positioned at the upper limit steering wheel angle. There is therefore no steering wheel torque-steer, or return effect as in the state of the art. Finally, when there is a loss of grip in an oversteer, it is easy to find a suitable counter-steering angle.

The invention may also have one or more of the following characteristics considered alone or in combination.

According to an embodiment, the power steering system is of the «steer-by-wire» type or of the mechanical type with variable gear reduction.

Thus, it is easy to implement a variable gear ratio.

According to an embodiment, the upper limit steering wheel angle is comprised between:

$$\frac{X_{csup}}{5} \qquad \text{[Math 3]}$$

$$X_{csup} \cdot 2 \qquad \text{And [Math 4]}$$

Where: $X_{csup}$ is the upper limit rack position.

According to an embodiment, the definition step comprises, for a considered vehicle speed:

A phase of determining a limit variation in which the limit variation of the gear ratio as a function of the steering wheel angle is determined so as to guarantee a controllability of the vehicle below this limit variation;

A phase of determining a grip steering wheel angle in which the grip steering wheel angle, corresponding to the steering wheel angle above which the vehicle no longer exhibits controllability, is determined;

A characterization phase in which the gear ratio is defined so that below the grip steering wheel angle, the gear ratio variation is less than or equal to the limit variation.

The definition step comprises, for each vehicle speed value, the phase of determining a limit variation, the phase of determining a grip steering wheel angle and the characterization phase. Indeed, the limit variation and the grip steering wheel angle depend in particular on the vehicle speed.

The gear ratio limit variation corresponds to the steering coefficient of the gear ratio curve as a function of the steering wheel angle, for the considered vehicle speed, that is to say for a given vehicle speed. The limit variation is a threshold beyond which the gear ratio varies too quickly for the controllability of the vehicle to be guaranteed at the considered speed. In other words, if the gear ratio varies according to a value lower than the limit variation, the vehicle can be controlled, whereas if the gear ratio varies according to a value greater than the limit variation, the vehicle is not necessarily controllable, that is to say there is a significant risk of loss of controllability.

The grip steering wheel angle is a threshold corresponding to a vehicle grip limit. In other words, beyond the grip steering wheel angle, the vehicle cannot be controlled, at the considered speed.

The limit variation and the grip steering wheel angle represent two criteria for defining the gear ratio in such a way as to guarantee the controllability of the vehicle. In other words, below the grip steering wheel angle, the gear ratio variation must be less than or equal to the limit variation so that the driver can control the vehicle.

According to an embodiment, the limit variation is determined when the vehicle is in at least one grip condition that is not favorable to the controllability of the vehicle.

Thus, whatever the grip conditions, when the gear ratio variation is less than the limit variation, the vehicle can be controlled.

According to an embodiment, the limit variation is determined as a function of at least one life condition of the vehicle.

A vehicle life condition corresponds to anything that influences a vehicle reaction. A life condition is, for example, a surface condition of a traffic lane, a surface condition of a wheel, the weight of the vehicle and its distribution in the vehicle, etc.

Thus, the limit variation is adapted to at least one life condition of the vehicle.

According to an embodiment, the gear ratio is defined during the characterization phase so that above the grip steering wheel angle, the variation of the gear ratio is greater than the limit variation.

Above the grip steering wheel angle, the vehicle cannot be controlled. Thus, when the grip steering wheel angle is exceeded, the driver wishes to quickly reach the upper limit steering wheel angle.

According to an embodiment, the phase of determining a limit variation and/or a grip steering wheel angle is carried out by means of a mathematical model or a physical test.

According to an embodiment, the grip steering wheel angle is determined when the vehicle is in at least one grip condition favorable to the controllability of the vehicle.

According to an embodiment, the grip steering wheel angle is determined as a function of at least one vehicle life condition.

According to an embodiment, the at least one favorable grip condition is a dry ground.

A dry floor means a floor with a grip coefficient greater than 0.8.

The invention also relates to a vehicle comprising a power steering system implementing a gear ratio determined according to the invention.

The invention will be better understood, thanks to the description below, which relates to an embodiment according to the present invention, given by way of non-limiting example and explained with reference to the appended schematic drawings, in which.

Only the elements necessary for understanding the invention have been represented. To facilitate reading of the drawings, the same elements carry the same references from one figure to another.

Figure 3:
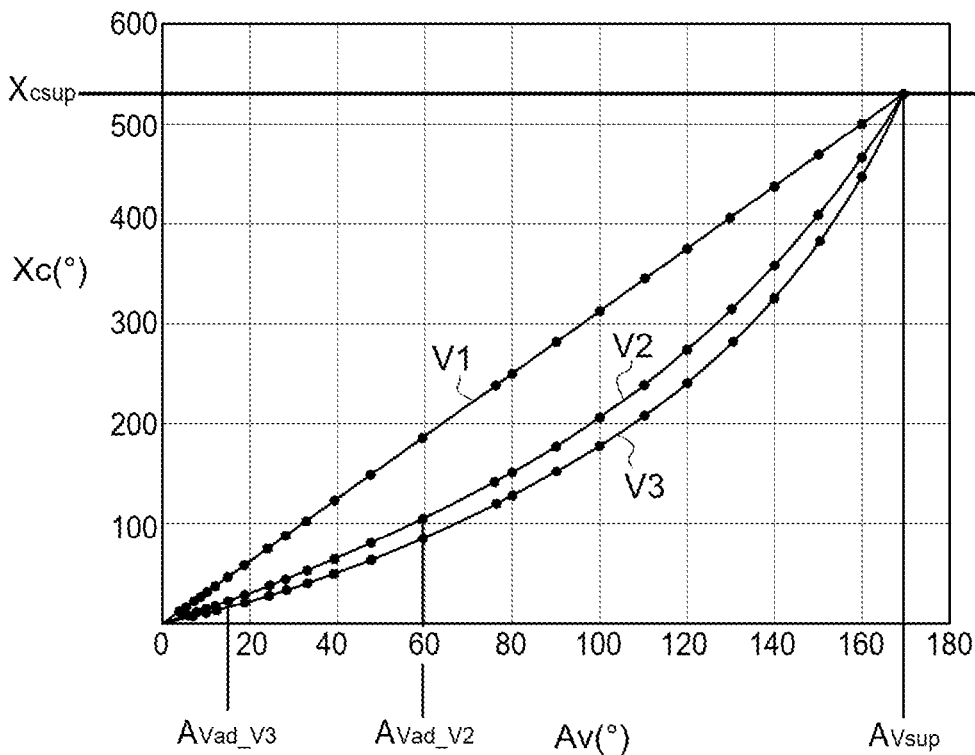
FIG. 3 is a diagram of the rack position as a function of the steering wheel angle by implementing the gear ratio according to the invention.

A mechanical type steering system with variable gear reduction, also called «Active Front Steering», or an electric power steering system without a mechanical link, called «steer-by-wire», comprises several elements including a steering wheel determining a steering wheel angle $A_v$, a rack determining a rack position $X_c$, and two wheels each connected to a tie-rod. The rack is displaced between two stops of a casing, said stops defining an upper limit rack position $X_{csup}$ making it possible to reach a maximum angle of orientation of the wheels, and a lower limit rack position. The stops can be real or virtual. In FIG. 3, the rack position $X_c$ varies by an angle ranging from $-530°$ to $530°$. However, only the part from $0°$ to $530°$ has been represented, the $0°$ being a center of symmetry.

A gear ratio VGR is defined as a ratio between the rack position $X_c$ and the steering wheel angle $A_v$, or between the steering wheel angle $A_v$ and the rack position $X_c$ according to the formula:

$$VGR = \frac{A_v}{X_c} \qquad \text{[Math 5]}$$

With:
VGR: the gear ratio,
$A_v$: the steering wheel angle
$X_c$: the rack position
Or by the formula [Math 6]

$$VGR = \frac{X_c}{A_v}$$

With:
VGR: the gear ratio,
$A_v$: the steering wheel angle
$X_c$: the rack position
It is generally accepted that the formula Math 2 is the inverse of the gear ratio. Thus, in the rest of the description, it is considered that the gear ratio is calculated with the formula Math 1.

The rack position $X_c$ corresponds to an image value of the rack position that can be measured directly on the rack or obtained by deduction or calculation. For example, the image of the rack position can be obtained by a position of an assistance motor modifying the rack position $X_c$, or by an orientation angle of the wheels or yaw angle of the wheels.

Similarly, the steering wheel angle $A_v$ corresponds to an image value of the steering wheel angle which can be measured directly on the steering wheel or obtained by deduction or calculation. For example, the image of the steering wheel angle can be obtained by a position of a motor exerting a torque on an axis of a column supporting the steering wheel or by an absolute angle sensor positioned on said axis of the column supporting the steering wheel.

The method according to the invention implements a definition step. During this step, the gear ratio VGR is defined as a function of a vehicle speed V1, V2, V3 and of the steering wheel angle $A_v$ so that the upper limit rack position $X_{csup}$ corresponds to a single upper limit steering wheel angle $A_{vsup}$.

More precisely, the definition step comprises, for a considered vehicle speed V1, V2, V3, that is to say a given vehicle speed V1, V2, V3, a phase of determining a limit variation, a phase of determining a grip steering wheel angle $A_{vad\_V2}$, $A_{vad\_V3}$ and a characterization phase.

In the phase of determining a limit variation, the limit variation of the gear ratio VGR as a function of the steering wheel angle $A_v$ is determined so as to guarantee controllability of the vehicle below this limit variation. The limit variation of the gear ratio VGR corresponds to the steering coefficient of the curve of the gear ratio VGR as a function of the steering wheel angle $A_v$ as represented, for example, in FIG. 2, for the considered vehicle speed V1, V2, V3. The limit variation is a threshold beyond which the gear ratio VGR varies too rapidly for the controllability of the vehicle to be guaranteed at the considered speed V1, V2, V3. In other words, if the gear ratio VGR varies by a value lower than the variation limit, the vehicle can be controlled, while if the gear ratio VGR varies by a value greater than the variation limit, the vehicle is not necessarily controllable, that is to say there is a significant risk of loss of controllability. In an embodiment, the limit variation is determined when the vehicle is in at least one grip condition not favorable to the controllability of the vehicle or/and the limit variation is determined according to at least one life condition of the vehicle.

During the phase of determining a grip steering wheel angle $A_{vad\_V2}$, $A_{vad\_V3}$, the grip steering wheel angle $A_{vad\_V2}$, $A_{vad\_V3}$, corresponding to the steering wheel angle $A_v$ above which the vehicle no longer exhibits controllability, is determined. The grip steering wheel angle $A_{vad\_V2}$, $A_{vad\_V3}$ is a threshold corresponding to a vehicle grip limit for a considered vehicle speed V1, V2, V3. In other words, beyond the grip steering wheel angle $A_{vad\_V2}$, $A_{vad\_V3}$, the vehicle is not controllable, that is to say it cannot be controlled, at the considered speed V1, V2, V3.

According to an embodiment, the grip steering wheel angle $A_{vad\_V2}$, $A_{vad\_V3}$ is determined when the vehicle is in at least one grip condition favorable to the controllability of the vehicle. For example, the at least one favorable grip condition is a dry ground.

According to an embodiment, the grip steering wheel angle $A_{vad\_V2}$, $A_{vad\_V3}$ is determined according to at least one life condition of the vehicle.

The characterization phase defines the gear ratio VGR for the considered vehicle speed V1, V2, V3. More specifically, the gear ratio VGR is defined so that below the grip steering wheel angle $A_{vad\_V2}$, $A_{vad\_V3}$, the variation of the gear ratio VGR is less than or equal to the limit variation. The limit variation and the grip steering wheel angle $A_{vad\_V2}$, $A_{vad\_V3}$ represent two limits to define the gear ratio VGR in such a way as to guarantee the controllability of the vehicle. In other words, below the grip steering wheel angle $A_{vad\_V2}$, $A_{vad\_V3}$, the gear ratio variation must be less than or equal to the limit variation so that the driver can control the According to an embodiment, the gear ratio VGR is also defined, during the characterization phase, so that above the grip steering wheel angle $A_{vad\_V2}$, $A_{vad\_V3}$, the variation of the gear ratio VGR is greater than the limit variation.

According to an embodiment, the phase of determining a limit variation and/or a grip steering wheel angle $A_{vad\_V2}$, $A_{vad\_V3}$ is carried out by means of a mathematical model or a physical test.

Thus, according to the invention, the gear ratio VGR depends on the vehicle speed V1, V2, V3. This ensures good maneuverability at low speed by determining a low gear ratio, and good controllability at high speed with a high gear ratio.

According to the invention, the gear ratio VGR also depends on the steering wheel angle $A_v$. Thus, the gear ratio VGR is adapted as a function of the steering wheel angle $A_v$ so that the upper limit rack position $X_{csup}$ corresponds to a single upper limit steering wheel angle $A_{vsup}$. In other words, whatever the speed of the vehicle V1, V2, V3, the steering wheel angle $A_v$ varies over a range, an upper limit of which is the upper limit steering wheel angle $A_{vsup}$.

In this way, when the driver turns the steering wheel so as to position the steering wheel according to the upper limit steering wheel angle $A_{vsup}$, and therefore the rack at the upper limit rack position $X_{csup}$, a decrease or an increase in the vehicle speed V1, V2, V3 does not modify the driver feeling. In other words, the steering wheel remains positioned at the upper limit steering wheel angle $A_{vsup}$. There is therefore no steering wheel torque-steer, or return effect as in the state of the art. Finally, when there is a loss of grip in an oversteer, it is easy to find a suitable counter-steering steering wheel angle $A_v$.

Figure 1:
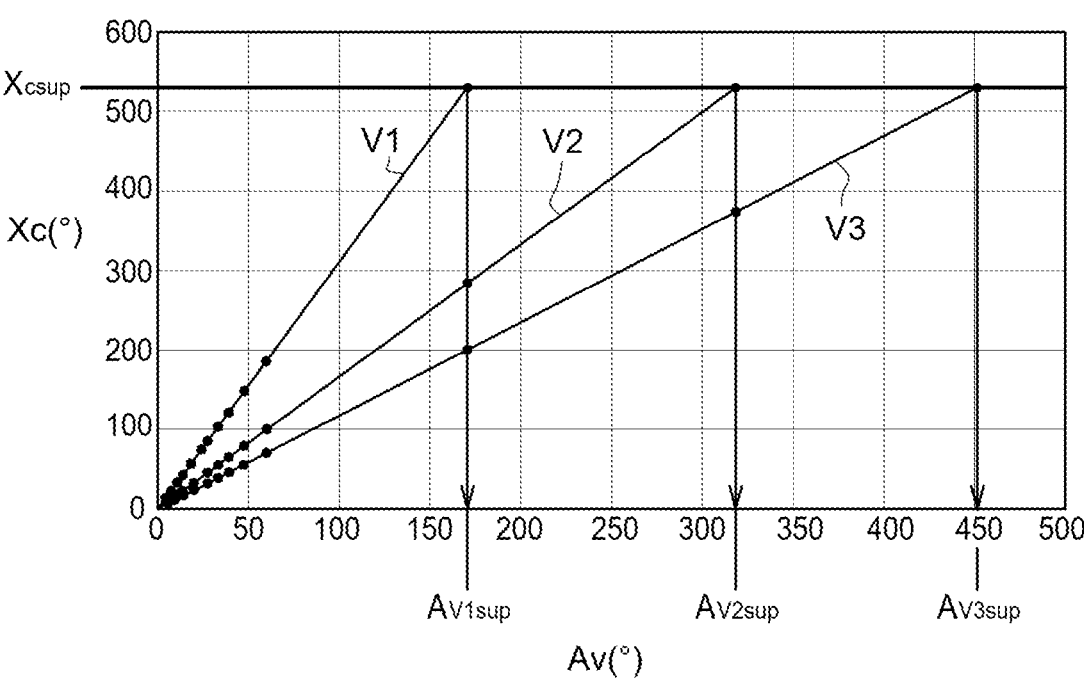
FIG. 1 is a diagram of a rack position as a function of a steering wheel angle by implementing a gear ratio according to the state of the art.
Figure 2:
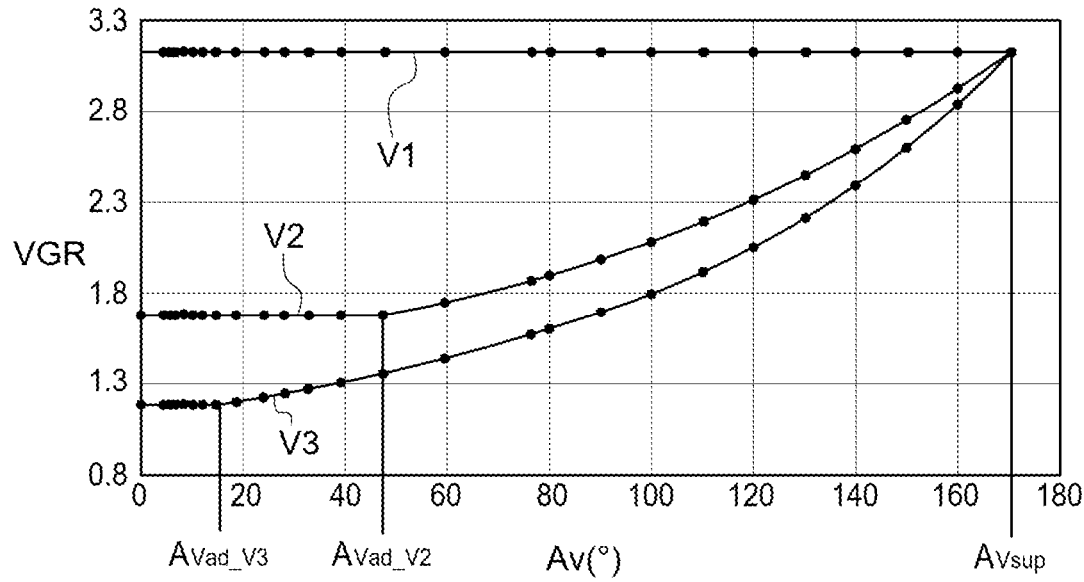
FIG. 2 is a diagram of a gear ratio as a function of the steering wheel angle according to the invention.

FIG. 2 illustrates a diagram representing the gear ratio VGR as a function of the steering wheel angle $A_v$ according to the invention according to three different vehicle speeds V1, V2, V3.

FIG. 3 illustrates the rack position $X_c$ as a function of the steering wheel angle $A_v$ for each of the three vehicle speeds V1, V2, V3.

For each vehicle speed V1, V2, V3, the limit variation of the gear ratio VGR was determined as well as the grip steering wheel angle $A_{vad\_V2}$, $A_{vad\_V3}$. In FIG. 2, the grip steering wheel angle for the speed V1 is not represented because at the speed V1, the vehicle is controllable over the entire range of the steering wheel angle. For the speed V2, the grip steering wheel angle $A_{vad\_V2}$ is equal to 45° and for the speed V3, the grip steering wheel angle $A_{vad\_V3}$ is equal to 18°. Before the grip steering wheel angle $A_{vad\_V2}$, $A_{vad\_V3}$, the variation of the gear ratio VGR is less than or equal to the limit variation. After the grip steering wheel angle $A_{vad\_V2}$, $A_{vad\_V3}$, the variation of the gear ratio VGR is selected so that the upper limit rack position $X_{csup}$ corresponds to the upper limit steering wheel angle $A_{vsup}$, whatever the value of the variation of the gear ratio VGR.

Of course, the invention is not limited to the embodiments described and shown in the appended figures. Modifications remain possible, in particular from the point of view of the constitution of the various elements or by substitution of technical equivalents, without departing from the scope of protection of the invention.

The invention claimed is:

1. A method for determining and setting a gear ratio for a power steering system of a vehicle, the power steering system comprising a steering wheel where a rotational position of the steering wheel determines a steering wheel angle and a rack where varying the rack between a lower limit rack position and an upper limit rack position determines a rack position, the gear ratio defining a ratio between the rack position and the steering wheel angle, or between the steering wheel angle and the rack position, wherein the method comprises a definition step in which the gear ratio is defined as a function of a vehicle speed and the steering wheel angle so that the upper limit rack position corresponds to a single upper limit steering wheel angle; and setting the gear ratio as defined in the definition step, wherein the definition step comprises, for each vehicle speed value:

determining a limit variation of the gear ratio as a function of the steering wheel angle, the limit variation being a threshold beyond which the gear ratio varies too quickly for controllability of the vehicle at the vehicle speed;

determining a grip steering wheel angle corresponding to the steering wheel angle above which the vehicle no longer exhibits controllability; and a characterization in which the gear ratio is defined so that below the grip steering wheel angle, variation of the gear ratio is less than or equal to the limit variation, and so that above the grip steering wheel angle, the variation of the gear ratio is greater than the limit variation.

2. The method according to claim 1, wherein the power steering system is a steer-by-wire power steering system or a variable gear reduction mechanical power steering system.

3. The method according to claim 1, wherein the upper limit steering wheel angle is comprised between:

$$\frac{X_{csup}}{5}$$

and $$X_{csup} \cdot 2$$

where: $X_{csup}$ is the upper limit rack position.

4. The method according to claim 1, wherein the determining the limit variation and/or the grip steering wheel angle is carried out by means of a mathematical model or a physical test.

5. The method according to claim 1, wherein the grip steering wheel angle is determined when the vehicle is in at least one grip condition favorable to the controllability of the vehicle.

6. The method according to claim 5, wherein the at least one grip condition is a dry ground.

7. A vehicle comprising a power steering system implementing a gear ratio determined according to claim 1.

* * * * *